United States Patent
Lewis et al.

(10) Patent No.: US 6,567,877 B1
(45) Date of Patent: *May 20, 2003

(54) AUTOMATICALLY ENABLING TERMINATOR FOR INTERNAL SCSI BUSES WITH EXTERNAL SCSI BUS EXPANSION

(75) Inventors: Quentin J. Lewis, Litchfield, NH (US); Andrey M. Hassan, Windham, NH (US)

(73) Assignee: Sun Microsystems, Inc., Mountain View, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 929 days.

(21) Appl. No.: 08/968,379

(22) Filed: Nov. 12, 1997

Related U.S. Application Data

(63) Continuation of application No. 08/715,719, filed on Sep. 19, 1996, now abandoned, which is a continuation of application No. 08/107,213, filed on Aug. 16, 1993, now abandoned.

(51) Int. Cl.[7] .................................................. G06F 13/00
(52) U.S. Cl. ............................. 710/305; 710/8; 326/30; 326/86; 326/85
(58) Field of Search .......................... 709/250; 710/305, 710/8; 257/529, 528, 530; 326/30, 31, 32, 33, 83, 84, 85, 86

(56) References Cited

U.S. PATENT DOCUMENTS

| | | | | |
|---|---|---|---|---|
| 5,120,909 A | * | 6/1992 | Kutz et al. | 178/64 R |
| 5,313,595 A | * | 5/1994 | Lewis et al. | 395/325 |
| 5,341,400 A | | 8/1994 | Davis | 375/36 |
| 5,381,034 A | * | 1/1995 | Thrower et al. | 257/529 |
| 5,434,516 A | | 7/1995 | Kosco | 326/30 |

FOREIGN PATENT DOCUMENTS

| | | | |
|---|---|---|---|
| JP | 0114624 | * | 1/1989 |
| JP | 3016445 | * | 1/1991 |
| JP | 3023706 | * | 1/1991 |
| JP | 4247742 | * | 9/1992 |
| JP | 04247742 | * | 9/1992 |

\* cited by examiner

*Primary Examiner*—Dung C. Dinh
(74) *Attorney, Agent, or Firm*—Blakely Sokoloff Taylor & Zafman

(57) ABSTRACT

A computer system contains a small computer standard interface (SCSI) having a plurality of components to interface a plurality of external peripheral devices to the computer system in accordance with a SCSI specification. Within the computer system, the SCSI interface contains a SCSI bus having an internal SCSI terminator at an internal end of the SCSI bus, and an internal switchable SCSI terminator at an external end of the SCSI bus. The SCSI bus permits expansion beyond the computer system enclosure at the external side of the SCSI bus via an external connector and cable to interface external SCSI peripheral devices to the computer system. The internal switchable SCSI terminator senses whether any external SCSI external peripheral devices or an external terminator are attached to the SCSI bus. If external SCSI peripheral devices and/or an external terminator are attached to the SCSI bus, then the internal switchable SCSI terminator does not terminate the SCSI bus on the external side. Alternatively, if the internal switchable SCSI terminator senses that no external SCSI peripheral devices or external terminator are attached, then the internal switchable SCSI terminator terminates the SCSI bus at the external end.

12 Claims, 3 Drawing Sheets

AUTOMATICALLY ENABLING TERMINATOR FOR INTERNAL SCSI BUSES WITH EXTERNAL SCSI BUS EXPANSION

This is a Rule 1.62 Continuation of application Ser. No. 08/715,719, filed Sep. 19, 1996, now abandoned, which is a Rule 1.62 Continuation of application Ser. No. 08/107,213, filed Aug. 16, 1993, now abandoned.

BACKGROUND OF THE INVENTION

1. Field of the Invention

The present invention relates to data communication in a computer system, and more specifically to methods and apparatus for an automatically enabling terminator for internal buses providing external bus expansion.

2. Art Background

A small computer standard interface (SCSI) specification defines a number of parameters to interface peripheral devices to computer systems. Typically, computer systems implementing the SCSI specification contain an internal bus. In addition, computer systems contain a connector so that the internal bus may be expanded external to the computer system. The expansion of the bus permits interfacing of a number of peripheral devices.

The SCSI bus specification specifies termination of the SCSI bus at both ends of the bus. Termination of the SCSI bus on the internal side presents little problem. On the internal side of the SCSI bus, a permanent termination device may be implemented. However, on an external side of the SCSI bus, either an expansion cable is connected to the connector or the SCSI bus does not expand externally.

If the SCSI bus is expanded beyond the expansion connector, then the external devices interfaced must provide termination of the SCSI bus. Alternatively, the external side of the SCSI bus is terminated with an external terminator directly connected to the external connector. However, in this configuration, the computer system is burdened with the costs associated with the external terminator assembly. Moreover, if a user disconnects an external device, the user may leave the external terminator off, thereby leaving the SCSI bus terminated only at the internal side of the SCSI bus. Therefore, it is desirable to terminate both ends of the SCSI bus such that a user need not use an external terminator. It is also desirable to provide an internal termination on both sides of the SCSI device without requiring a user to set a jumper switch. The present invention provides a reliable termination for both sides of the SCSI bus without user intervention thereby saving the cost of an external terminator and the possibility of incorrect termination.

SUMMARY OF THE INVENTION

A computer system contains a small computer standard interface (SCSI) having a plurality of components to interface external peripheral devices to the computer system in accordance with a SCSI specification. Within the computer system, the SCSI interface contains a SCSI bus having an internal SCSI terminator at an internal end of the SCSI bus, and an internal switchable SCSI terminator at an external end of the SCSI bus. The internal SCSI terminator provides impedance termination on the internal side of the SCSI bus in accordance with the SCSI specification. The SCSI bus permits expansion beyond the computer system enclosure at the external side of the SCSI bus via an external connector and cable. The expanded SCSI bus permits interfacing of external SCSI peripheral devices to the computer system. The internal switchable SCSI terminator automatically provides termination at the external side of the SCSI bus when no external SCSI peripheral devices or external terminators are coupled to the SCSI bus.

The internal switchable SCSI terminator of the present invention senses whether any external SCSI peripheral devices are attached to the SCSI bus. If external SCSI peripheral devices and/or an external terminator are attached to the SCSI bus, then the internal switchable SCSI terminator does not terminate the SCSI bus on the external side. Alternatively, if the internal switchable SCSI terminator senses that no external SCSI peripheral devices or external terminator are attached, then the internal switchable SCSI terminator terminates the SCSI bus at the external end. Consequently, if a user does not attach external SCSI peripheral devices and fails to terminate the SCSI bus at the external end, then the bus is automatically terminated by the internal switchable SCSI terminator. Because the internal switchable SCSI terminator automatically senses the presence of an external SCSI device or external terminator, no manual switch, such as a dip switch, is required on the SCSI interface.

BRIEF DESCRIPTION OF THE DRAWINGS

The objects, features, and advantages of the present invention will be apparent from the following detailed description of the preferred embodiment of the invention with references to the following drawings.

DETAILED DESCRIPTION OF THE INVENTION

Methods and apparatus for an automatically enabling terminator for internal buses providing external bus expansion are disclosed. In the following description, for purposes of explanation, specific nomenclature is set forth to provide a thorough understanding of the present invention. However, it will be apparent to one skilled in the art that these specific details are not required to practice the present invention. In other instances, well known circuits and devices are shown in block diagram form to avoid obscuring the present invention unnecessarily.

Figure 1:
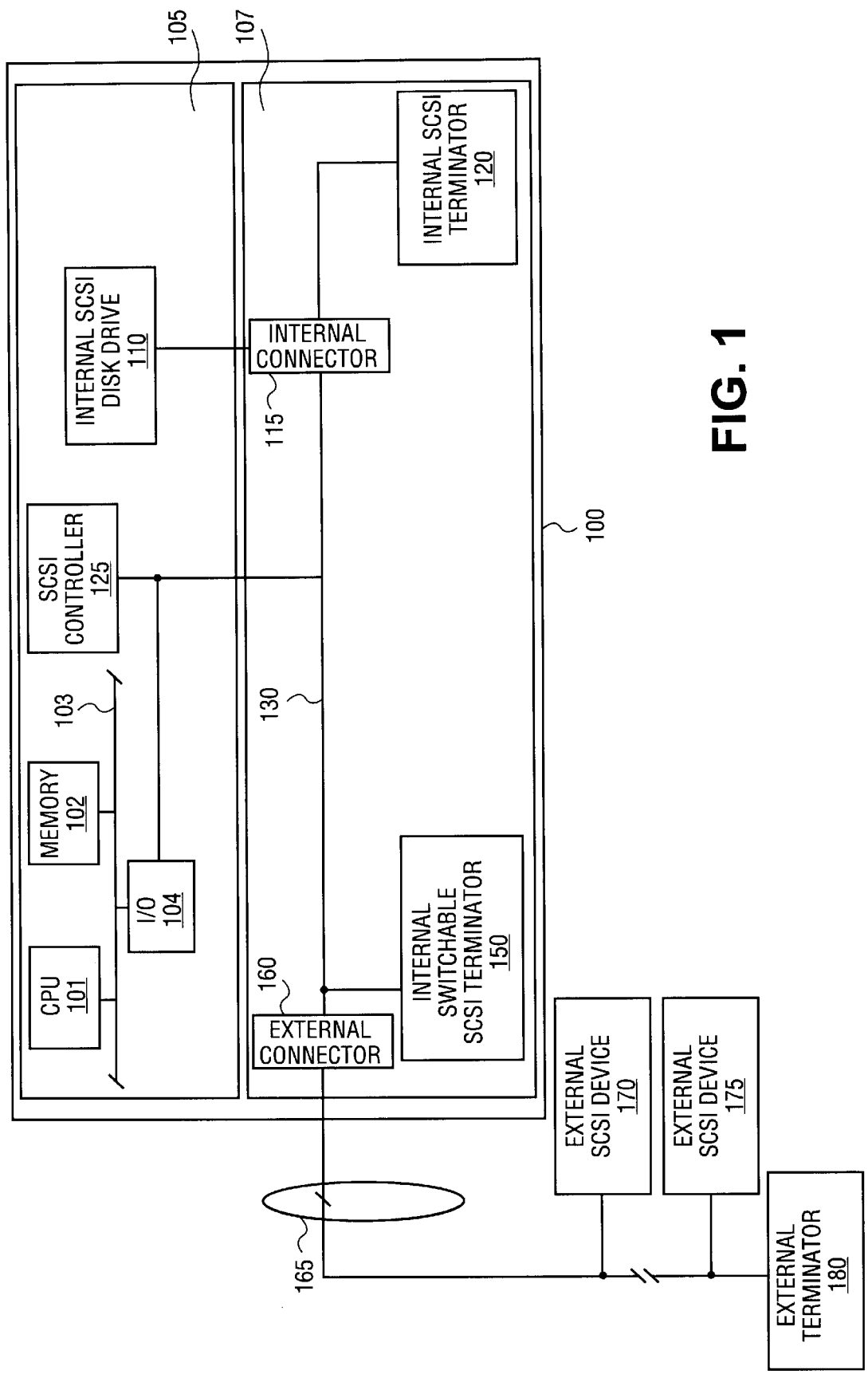
FIG. 1 illustrates a computer system incorporating a small computer standard interface (SCSI) configured in accordance with the present invention.

Referring to FIG. 1, a computer system incorporating a small computer standard interface (SCSI) configured in accordance with the present invention is illustrated. A computer system 100 contains a main portion 105 and a SCSI interface 107. The main portion 105 contains a central processing unit (CPU) 101, memory 102, an I/O interface 104, and a SCSI controller 125. The CPU 101, memory 102, and I/O interface 104 are connected by a bus 103. The SCSI controller 125 generates signals to control the operation of the SCSI bus 130 in accordance with the SCSI specification. The main portion 105 also contains an internal SCSI disk drive 110. The internal SCSI drive 110 is accessed in accordance with a SCSI specification. The internal SCSI disk 110 provides mass memory storage for the computer system 100. The CPU 101, memory 102, bus 103 and I/O interface 104 are those devices typically found in computer systems, and, in fact, the main portion 105 is intended to represent a broad category of data processing devices which are well known in the art and will not be described further.

The SCSI interface 107 contains a plurality of devices to interface external peripheral devices to the computer system 100 in accordance with the SCSI specification. Specifically, the SCSI interface 107 contains a SCSI bus 130. In a preferred embodiment of the present invention, the SCSI bus 130 couples an internal connector 115 with an external connector 160. For purposes of explanation, the internal side of the SCSI bus 130 is defined as the portion of the SCSI bus 130 coupling the SCSI interface 107 to the main portion 105. The external side of the SCSI bus 130 is the portion located near the external connector 160 that allows expansion of the SCSI bus beyond the computer system 100 enclosure.

The SCSI interface 107 also contains an internal SCSI terminator 120 and an internal switchable SCSI terminator 150. The internal SCSI terminator 120 provides impedance termination on the internal side of the SCSI bus 130. The SCSI bus 130 may comprise an 8 or 16 bit data SCSI specification bus. The bus bandwidth characteristics of the SCSI bus do not affect the operation of the present invention. The internal switchable SCSI terminator 150 is coupled to the SCSI bus 130 near the external connector 160. In general, the internal switchable SCSI terminator 150 provides termination at the external side of the SCSI bus when the SCSI bus is not extended external to the computer system 100. The internal switchable SCSI terminator 150 is described fully below. Also shown in FIG. 1 is an external SCSI device 170, and external SCSI device 175. The external SCSI devices 170 and 175 may comprise hard drives, tape drives and other external peripheral devices that provide functionality to the computer system 100. The external SCSI devices 170 and 175 are coupled to the computer system via an SCSI cable 165. In addition, up to seven internal and external SCSI devices may be attached to computer system 100 in accordance with the SCSI bus specification. Also shown in FIG. 1 is an external terminator 180. The external terminator provides an external termination to the SCSI bus when external devices are attached in accordance with the SCSI specification.

In operation, a user, desiring to interface external SCSI peripheral devices to the computer system 100, expands the SCSI bus 130 via the cable 165. The cable 165 extends the SCSI bus externally from the computer system 100. Upon power-up of the computer system 100, the internal switchable SCSI terminator 150 of the present invention senses whether any external SCSI peripheral devices or an external terminator are attached to the SCSI bus 130. If external SCSI peripheral devices and/or an external terminator are attached to the SCSI bus 130, then the internal switchable SCSI terminator 150 does not terminate the SCSI bus 130 on the external side. Alternatively, if the internal switchable SCSI terminator 150 senses that no external SCSI peripheral devices or external terminator are attached, then the internal switchable SCSI terminator 150 terminates the SCSI bus 130 at the external end. Consequently, if a user does not attach external SCSI peripheral devices and fails to terminate the SCSI bus 130 at the external end, then the bus is automatically terminated by the internal switchable SCSI terminator 150. Also, if the user places an external terminator either on the extended SCSI bus, or the on the external connector 160, the SCSI bus 130 is not terminated twice on the external end. Because the internal switchable SCSI terminator 150 automatically senses the presence of an external SCSI device or external terminator, no manual switch, such as a dip switch, is required on the SCSI interface 107.

Figure 2:
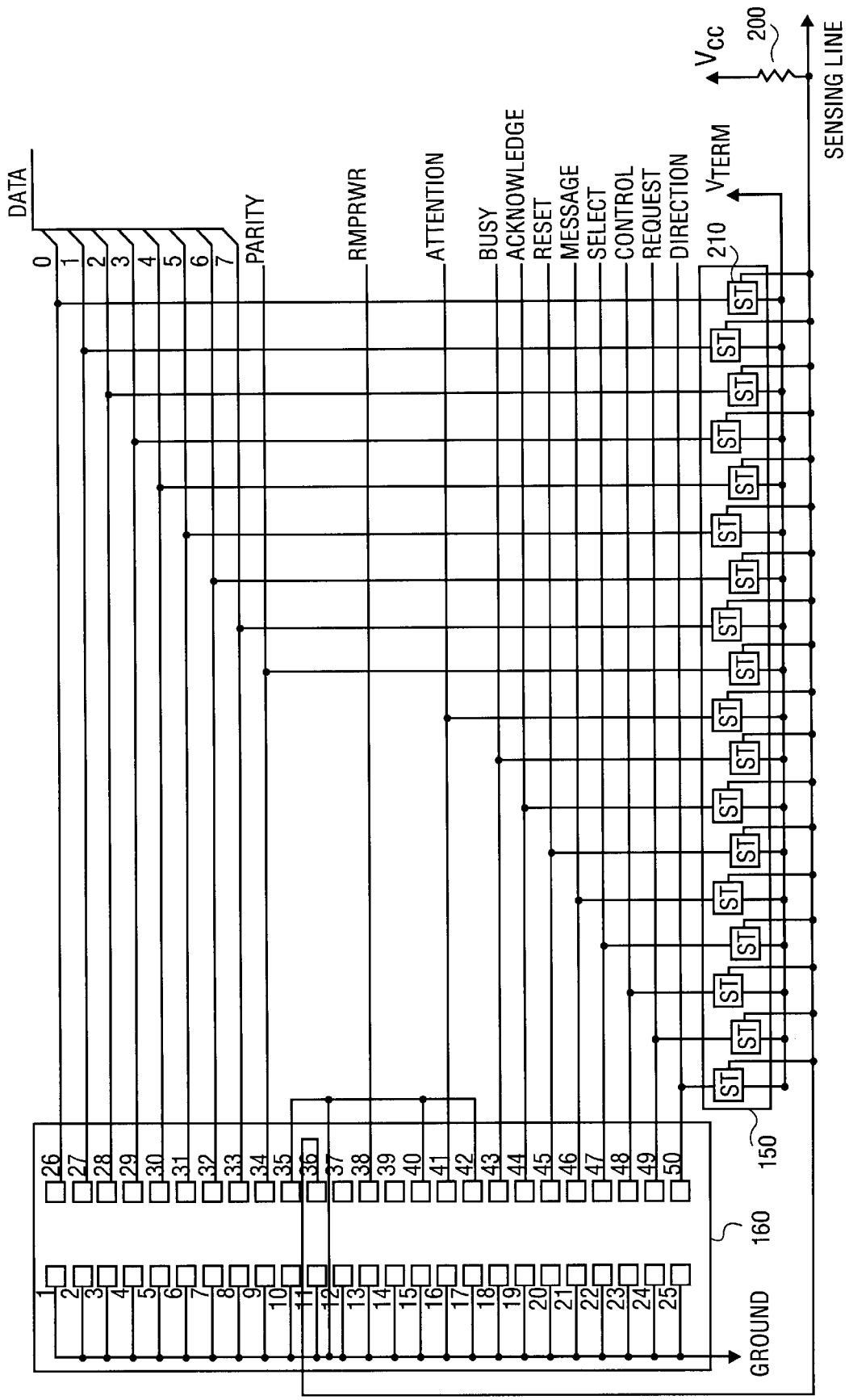
FIG. 2 illustrates a SCSI bus signal lines configured in accordance with the present invention.

Referring to FIG. 2, SCSI bus signal lines configured in accordance with the present invention are illustrated. As shown in FIG. 2, the external connector 160 contains fifty connections. In the SCSI specification, pin 36 is specified as ground. In a preferred embodiment of the present invention, pin 36 on the external connector 160 comprises a sensing line. However, any pin specified as ground by the SCSI specification could be utilized for a sensing line. The sensing line connects pin 36 on the external connector 160 to a power supply, such as Vcc, via a pull-up resistor 200. FIG. 2 also illustrates a more detailed illustration of the internal switchable SCSI terminator 150. Specifically, the internal switchable SCSI terminator 150 contains a plurality of individual switchable terminators. The individual switchable terminators, labeled ST on FIG. 2, are connected to each SCSI signal line on the SCSI bus requiring termination. Each individual switchable terminator is also connected to a power supply voltage such as VTERM and to the sensing line. The sensing line controls switching of each individual switchable terminator to either turn on or off the individual switchable terminators. FIG. 2 also illustrates data and handshake signals for an 8 bit SCSI bus. Note that the position of pin 36 is in close proximity to static handshake lines only. Utilizing pin 36 for the sensing line does not affect the impedance of any of the non-static SCSI signal lines.

Figure 3:
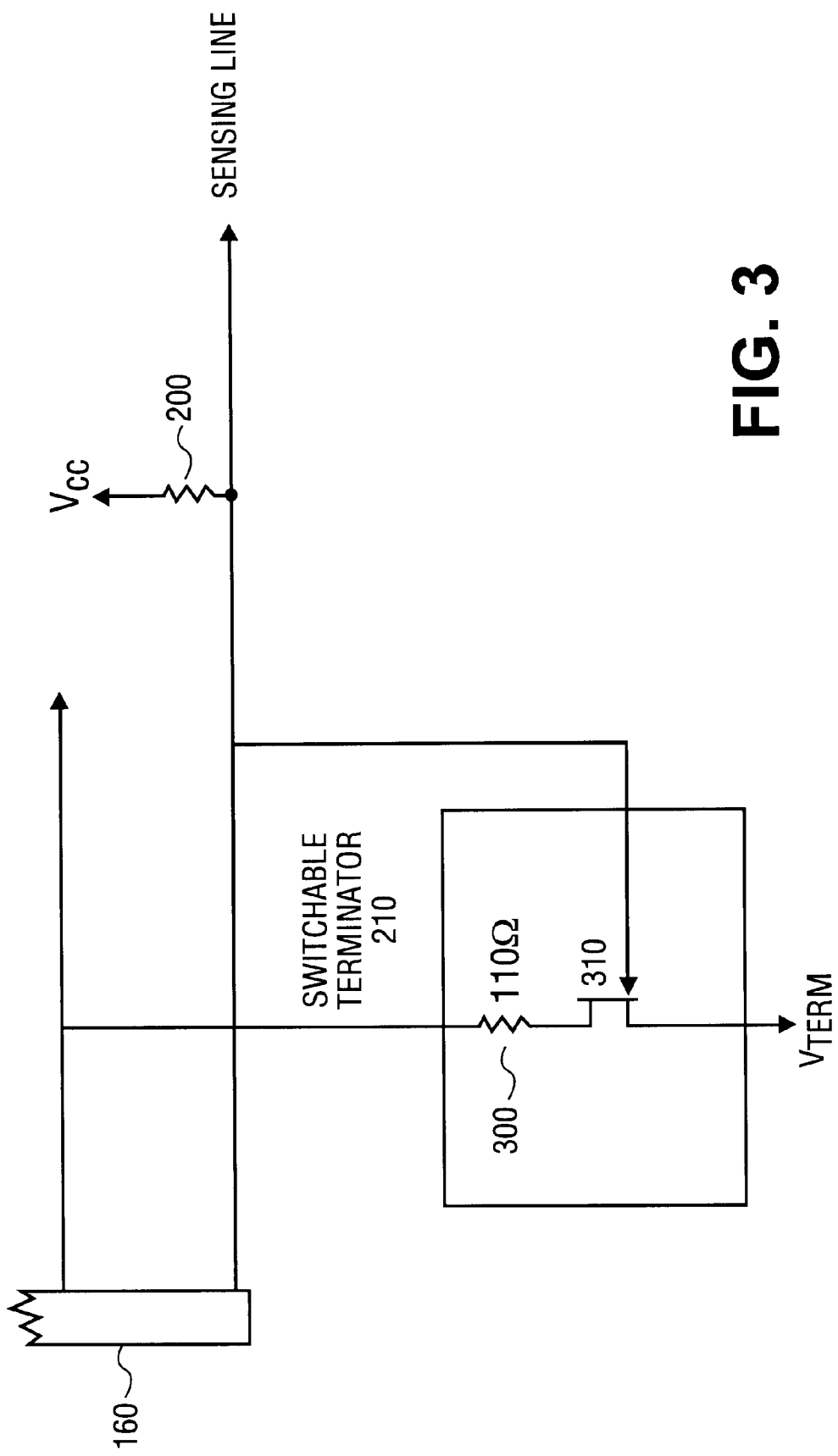
FIG. 3 illustrates an individual switchable terminator configured in accordance with the present invention.

Referring to FIG. 3, an individual switchable terminator 210 configured in accordance with the present invention is illustrated. Individual switchable terminator 210 contains a termination resistor 300 and a switch 310. In a preferred embodiment of the present invention, the termination resistor 300 comprises a 110 ohm resistor, and the switch 310 comprises an n-channel junction field effect transistor (JFET). In operation, if an external SCSI peripheral device or external terminator (generally referred to as an "external termination device") connected to the external connector 160, then pin 36 is pulled to ground in accordance with the SCSI specification. The pull-up resistor 200 has a value of 10,000 ohms, thereby allowing the external SCSI device to pull the sensing line to ground. The sensing line is couple to the gate of JFET 310. Therefore, when a low voltage level is applied to the gate of JFET 310, JFET 310 is turned off such that no current is conducted from the drain to the source of JFET 310. Accordingly, a low voltage level on sensing line turns off individual switchable terminator 210 such that all SCSI signal lines are not terminated on the SCSI interface 107 at the external end.

Alternatively, if no external SCSI peripheral device or external terminator is attached, then the sensing line is pulled to a high voltage level via pull-up resistor 200. A high voltage level applied at the gate of JFET 310 biases the JFET 310 to conduct current from the drain to the source. Accordingly, a high voltage level on sensing line turns on individual switchable terminator 210 such that all SCSI signal lines are terminated on the SCSI interface 107 at the external end. The conducting n-channel JFET provides a switch to terminate each SCSI line. Therefore, through use of the sensing line, individual switchable terminator 210 automatically senses whether an external SCSI device or an external terminator is attached and terminates the bus accordingly.

Although the present invention has been described in terms of a preferred embodiment, it will be appreciated that various modifications and alterations might be made by those skilled in the art without departing from the spirit and scope of the invention. The invention should therefore be measured in terms of the claims which follow.

What is claimed is:

1. A bus system for use in a computer system having an external periphery comprising:
   a small computer standard interface (SCSI) bus including a plurality of bus signal lines, the SCSI bus having an internal connector terminated by a fixed termination and a multi-pin external connector mounted to the external periphery of the computer system to interface with a removable, external termination device; and
   an apparatus coupled to each of the plurality of bus signal lines to automatically enable termination of the bus signal lines of the SCSI bus in parallel at the external connector when the external termination device is disconnected from the SCSI bus, the apparatus including
      a sensing line coupled to a pin of the external connector, the sensing line to sense whether the external termination device is coupled to the SCSI bus, the sensing line being common to the bus signal lines,
      a pull-up resistor coupled to the sensing line, the pull-up resistor driving the sensing line to a high voltage level if the external termination device is disconnected from the SCSI bus,
      at least one termination resistor coupled to each of the plurality of bus signal lines of the SCSI bus to provide a terminating impedance at the external connector of the SCSI bus, and
      a plurality of switches each including a transistor having a gate coupled to the sensing line, each of the plurality of switches coupled to one of the plurality of termination resistors and terminating a separate bus signal line of the SCSI bus if the sensing line is pulled to the high voltage level.

2. The system of claim 1 wherein the transistor of each switch comprises a n-channel junction field effect transistor (JFET).

3. The system of claim 1, wherein the pin of the external connector, configured in accordance with the SCSI specification is a ground pin.

4. The system of claim 3 wherein the sensing line is a single signal line.

5. The bus system according to claim 1, wherein the at least one removable, external termination device includes one of a hard drive and a tape drive.

6. In a computer system including a small computer standard interface (SCSI) bus having an internal end terminated by a fixed termination and an external end coupled to a plurality of switchable terminators each including a transistor and mounted to the periphery of the computer system to interface at least one removable, external termination device with the computer system, a method for automatically enabling termination of the SCSI bus at the external end if the external termination device is disconnected from the SCSI bus, the method comprising:
   determining whether the external termination device is connected to the external end of the SCSI bus by monitoring a voltage level on a sensing line, the sensing line being common to the switchable terminators;
   driving the sensing line, coupled to a transistor gate of each switchable terminator, to a high voltage level if the external termination device is disconnected from the SCSI bus, the sensing line terminating the SCSI bus by turning on the transistor of each switchable terminator to connect each switchable terminator to the external end of the SCSI bus; and
   driving the common sensing line to a low voltage level if the external termination device is connected to the SCSI bus, the sensing line turning off the transistor of each switchable terminator to disconnect each switchable terminator at the external end from the SCSI bus.

7. The method of claim 6 wherein the sensing line is connected to a ground pin of an external connector, the external connector, a multi-pin connector configured in accordance with the SCSI specification, being coupled to the external end of the SCSI bus.

8. A bus system for use in a computer system having an external periphery, the bus system comprising:
   a multi-line internal bus including a plurality of bus signal lines coupled to an internal connector terminated by a fixed termination and coupled to an external connector to interface with at least one removable, external termination device; and
   an apparatus for automatically enabling termination of the internal bus in parallel at the external connector, the apparatus including
      a single sensing line coupled to a ground pin of the external connector, the sensing line to sense whether the external termination device is coupled to the internal bus, the sensing line being common to the bus signal lines,
      a pull-up resistor coupled to the sensing line, the pull-up resistor driving the sensing line to a high voltage level if the external termination device is disconnected from the internal bus,
      at least one termination resistor coupled to each of the plurality of bus signal lines of the internal bus, and
      a plurality of switches each including a transistor coupled to one of the plurality of termination resistors and having a gate coupled to the sensing line, each of the plurality of switches terminates a distinct bus signal line of the internal bus if the sensing line is pulled to the high voltage level.

9. The bus system of claim 8 wherein the internal bus comprises a small computer standard interface (SCSI) bus operating in accordance with a SCSI specification.

10. The bus system of claim 9, wherein the apparatus further comprises ground means coupled to the single sensing line for allowing the single sensing line to be pulled to a low voltage level if the external termination device is connected.

11. The system of claim 8 wherein each transistor of the plurality of switches comprises a n-channel junction field effect transistor (JFET).

12. The bus system according to calim 8, wherein the at lest one removable, external termination device includes one of a hard drive and a tape drive.

* * * * *